(12) United States Patent
Grandominico et al.

(10) Patent No.: US 7,829,165 B2
(45) Date of Patent: Nov. 9, 2010

(54) TRAILER WALL COMPOSITE LINER WITH INTEGRAL SCUFF PANEL

(75) Inventors: Gary Alan Grandominico, Galena, OH (US); Raymond A. McDonald, Jr., Savannah, GA (US); Dominic Plauche Grandominico, Columbus, OH (US)

(73) Assignee: Ridge Corporation, Pataskala, OH (US)

( * ) Notice: Subject to any disclaimer, the term of this patent is extended or adjusted under 35 U.S.C. 154(b) by 979 days.

(21) Appl. No.: 11/355,053

(22) Filed: Feb. 15, 2006

(65) Prior Publication Data

US 2007/0110944 A1    May 17, 2007

Related U.S. Application Data

(60) Provisional application No. 60/737,119, filed on Nov. 16, 2005.

(51) Int. Cl.
*B32B 3/00* (2006.01)
*B62D 53/06* (2006.01)
*E04B 5/00* (2006.01)

(52) U.S. Cl. .............................. 428/57; 52/272; 52/578; 280/423.1; 296/186.1; 428/60; 428/292.1

(58) Field of Classification Search .................. 428/57, 428/292.1, 60; 52/272, 578; 280/423.1; 296/186.1
See application file for complete search history.

(56) References Cited

U.S. PATENT DOCUMENTS 3,419,447 A * 12/1968 Hewitt ........................ 156/73.3

| | | | |
|---|---|---|---|
| 6,220,651 B1 | 4/2001 | Ehrlich | |
| 6,505,883 B1 | 1/2003 | Ehrlich | |
| 2002/0148196 A1 * | 10/2002 | Barry et al. | 52/742.1 |
| 2005/0042433 A1 * | 2/2005 | Jones et al. | 428/292.1 |
| 2006/0019078 A1 * | 1/2006 | Osten et al. | 428/292.1 |

OTHER PUBLICATIONS

Two-Page Brochure for the Sonics 40kHz Ultrasonic Plastics Welding System Models 4095/4096, manufactured by Sonics & Materials, Inc., Copyright 2005.

* cited by examiner

*Primary Examiner*—David R Sample
*Assistant Examiner*—Brent T O'Hern
(74) *Attorney, Agent, or Firm*—Tarolli, Sundheim, Covell & Tummino LLP

(57) ABSTRACT

A thermoplastic composite liner for use as an inner wall of a trailer. The thermoplastic composite liner includes a glass reinforced thermoplastic sheet permanently affixed to a glass reinforced thermoplastic scuff panel along a length of the scuff panel by ultrasonic welding. The scuff panel is positioned relative to the thermoplastic sheet such that an edge portion of the thermoplastic sheet overlaps an edge portion of the scuff panel along the length of the scuff panel, the ultrasonic welding forming a weld joint between the overlapping edge portions of the thermoplastic sheet and the scuff panel along the length of the scuff panel. Preferably, the thermoplastic sheet and the scuff panel are fabricated of fiberglass reinforced plastic, such as polypropylene resin reinforced with glass fiber and the glass reinforced thermoplastic scuff panel includes fibrous material on one side of the scuff panel, the scuff panel being positioned such that the fibrous material side of the panel faces the thermoplastic sheet during the ultrasonic welding.

5 Claims, 9 Drawing Sheets

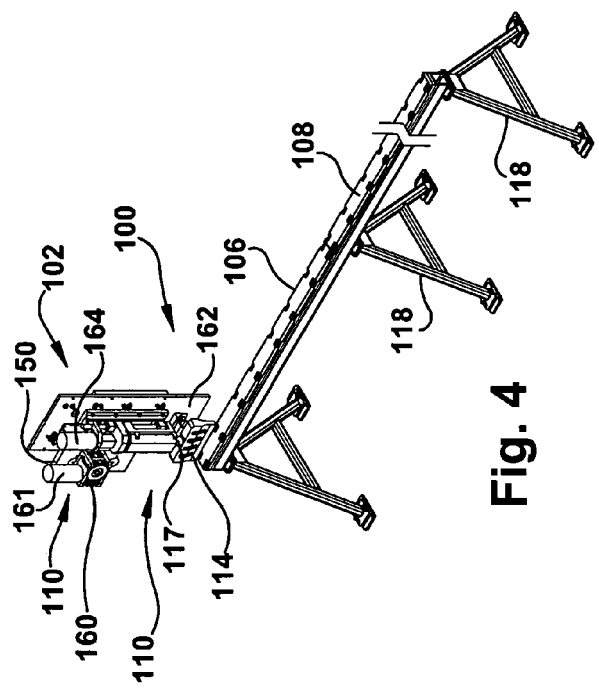
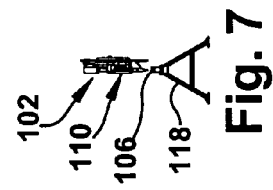
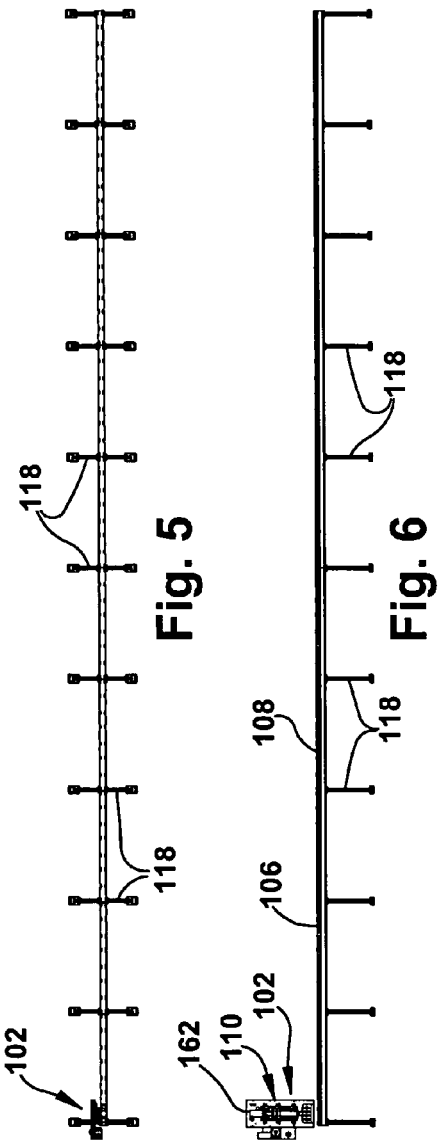

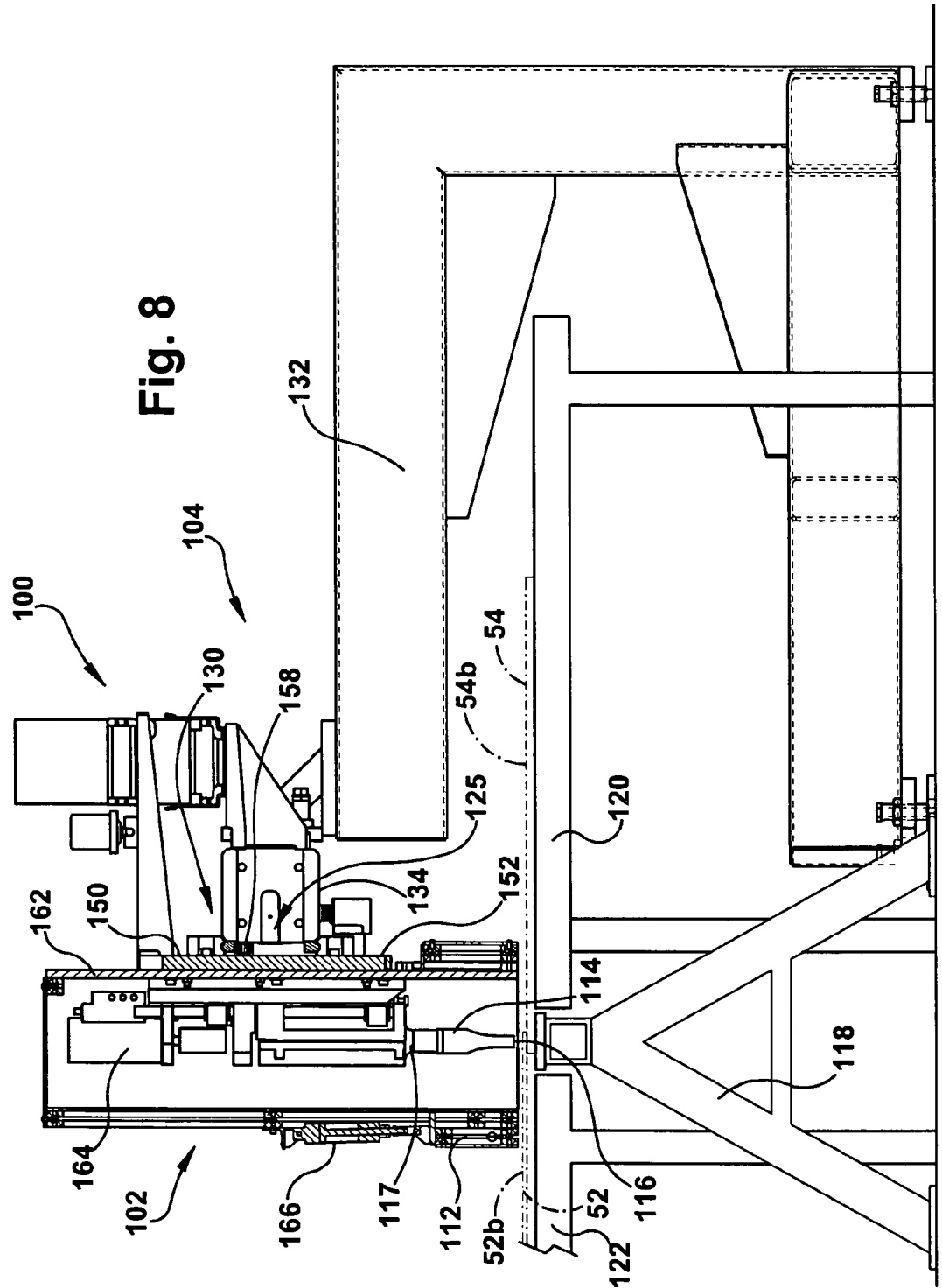

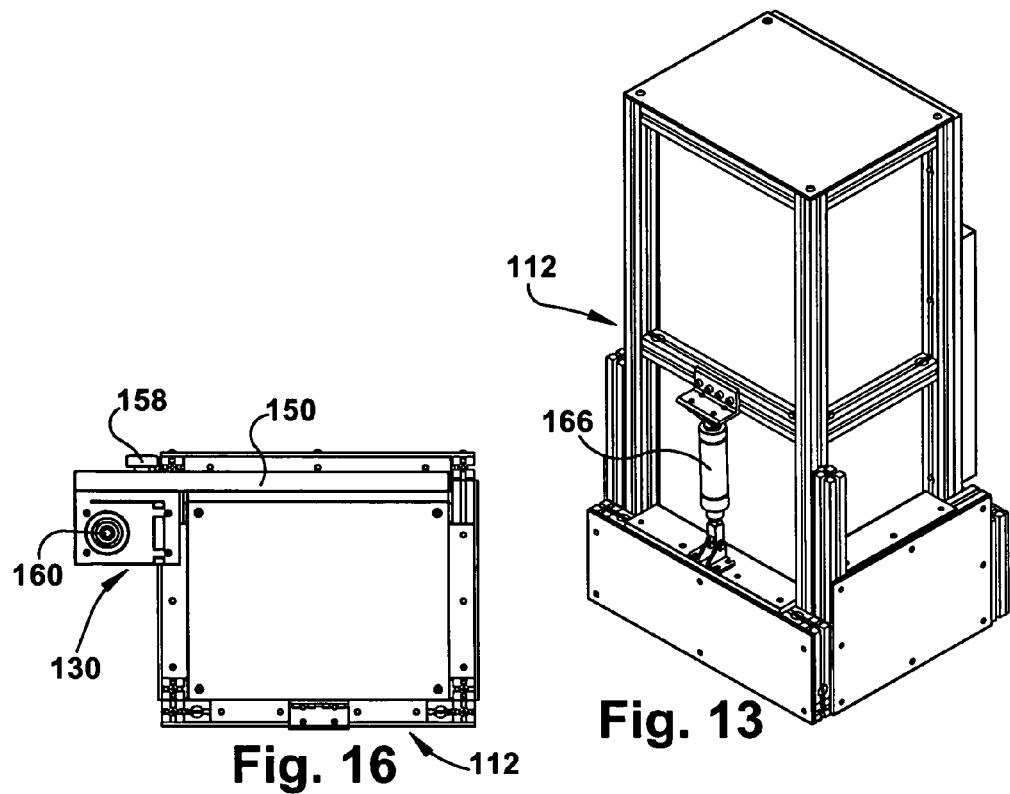
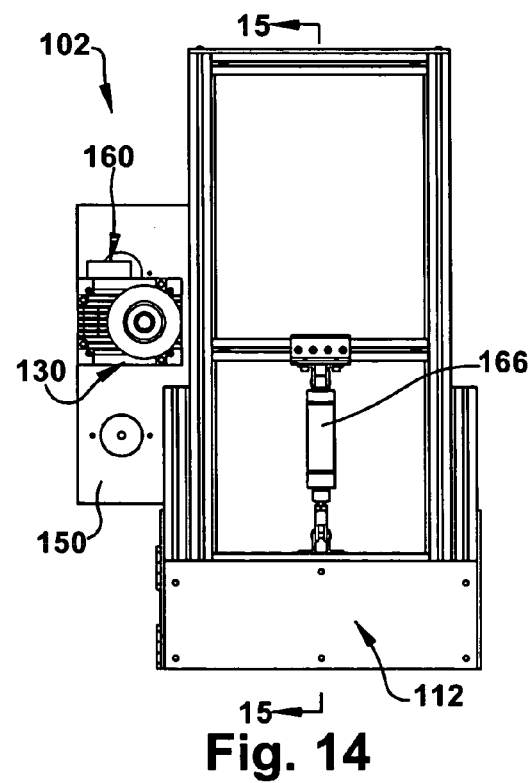
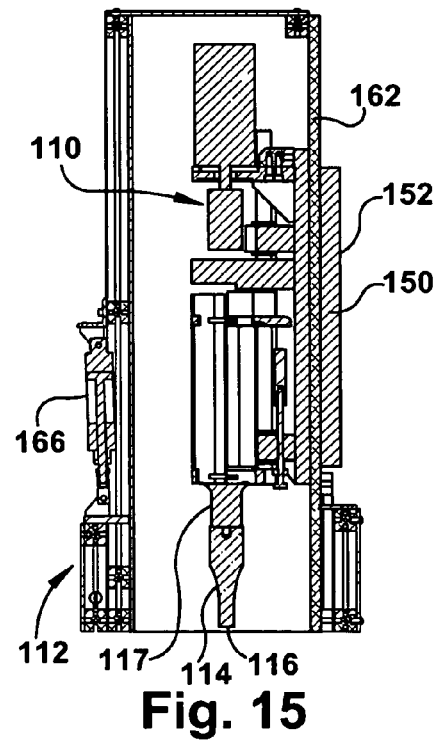

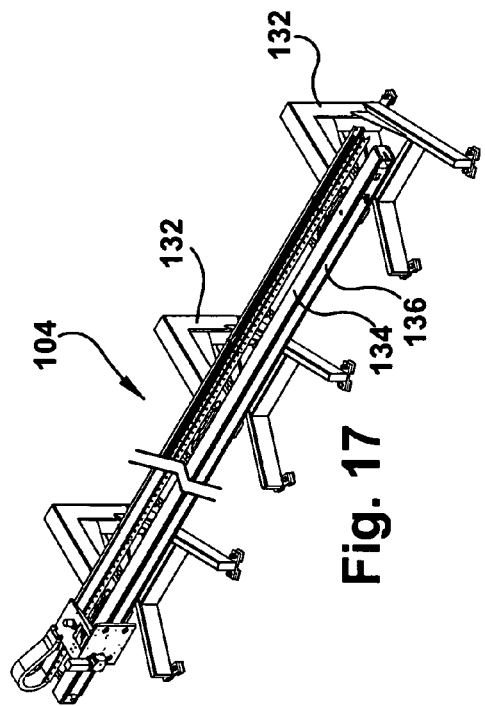
Fig. 17
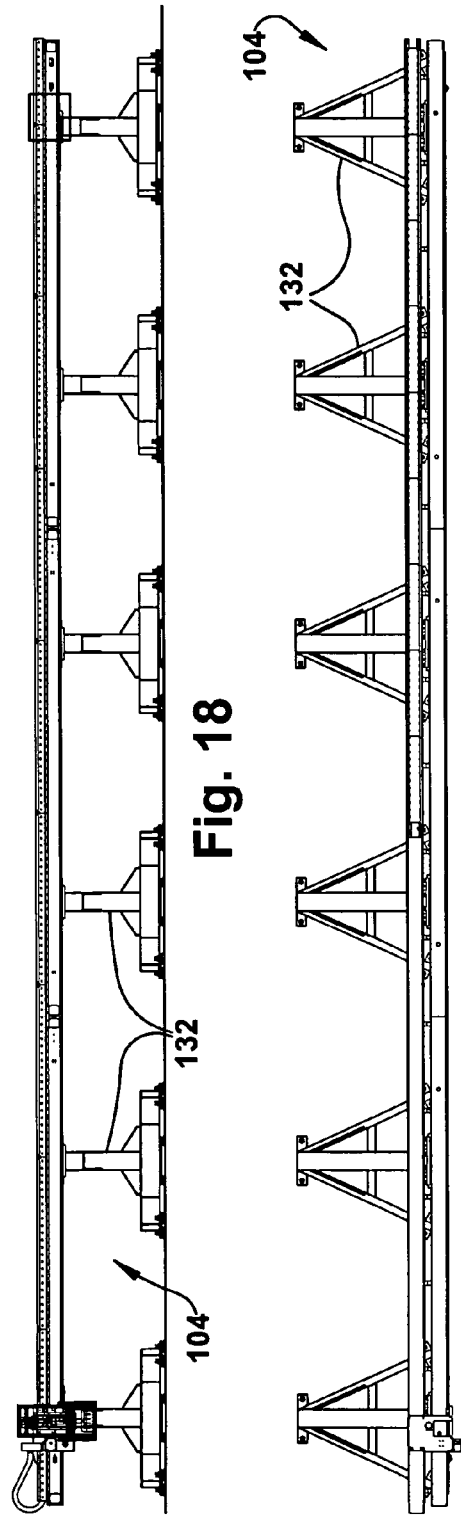
Fig. 18
Fig. 19

TRAILER WALL COMPOSITE LINER WITH INTEGRAL SCUFF PANEL

CROSS-REFERENCE TO RELATED APPLICATION

This application claims priority from Provisional Application No. 60/737,119, filed on Nov. 16, 2005. Provisional Application No. 60/737,119 is incorporated in its entirety herein by reference.

FIELD OF THE INVENTION

The present invention relates to wall liners suitable for use in vehicles such as trailers, trucks, vans, and rail cars and, more particularly, to a glass reinforced thermoplastic wall liner with an integral scuff panel.

BACKGROUND OF THE INVENTION

Cargo carrying vehicles such as refrigerated and dry freight trailers, vans, delivery trucks and rail cars typically include a cargo holding body having a floor supported on an undercarriage, a roof, a rear door and side walls extending between the floor and the roof. For brevity, as used herein, all such cargo carrying vehicles will be referred to as trailers. The side walls include support members that support inner (interior) and outer (exterior) side walls or skins. The roof includes an interior wall. Because cargo is often loaded into the trailer body on pallets using lift trucks, the interior walls are subject to damage from the pallets and lift truck forks.

Traditionally, wood was used for trailer inner walls. However, wood has several disadvantages including relatively heavy weight of the wood reducing fuel economy and trailer load capacity and susceptibility to damage from pallets and lift truck forks. One proposed solution was to replace some or all of the wood used for the inner walls with a plastic composite material (e.g., fiber reinforced plastic) liner. Such plastic composite liners are durable and lighter in weight than the wood.

Depending on the nature of the cargo being shipped, certain portions of the plastic composite liner were subject to frequent impact and damage, for example, by the extending forks of a lift truck during loading and unloading of pallets. Portions of the plastic composite liner subject to frequent impact and damage were reinforced with a scuff panel or band (commonly referred to in the industry as a "scuff") to provide additional protection to the liner. The scuff panel, for example, may extend horizontally along a bottom portion of the plastic composite liner adjacent to the floor to protect against repeated impact of lift truck forks when pallets are placed on or lifted from the trailer floor. The scuff panel may be fabricated in steel, aluminum, plastic or plastic composite materials.

Different methods have been used for affixing a scuff panel to a plastic composite liner including fasteners, welding or use of a bonding agent. Such methods have proved costly and cumbersome to implement and, in some cases, create snag points along the liner that can damage cargo, the liner or the scuff panel.

What is needed is a plastic composite liner with an integral scuff panel for a trailer that is efficient and economical to fabricate. What is also needed is a plastic composite liner with an integral scuff panel that is lightweight, impact resistant and durable. What is also needed is a plastic composite liner with an integral scuff panel which has a smooth, snag-free inwardly facing surface. What is also needed is an economical and efficient method of affixing a scuff panel to a plastic composite liner to create a liner with an integral scuff panel with a high joint strength between the liner and the scuff panel.

SUMMARY OF THE INVENTION

The present invention is directed to a thermoplastic composite liner for use as an inner wall of a trailer. The thermoplastic composite liner includes a glass reinforced thermoplastic sheet permanently affixed to a glass reinforced thermoplastic scuff panel along a length of the scuff panel by ultrasonic welding. The scuff panel is positioned relative to the thermoplastic sheet such that an edge portion of the thermoplastic sheet overlaps an edge portion of the scuff panel along the length of the scuff panel, the ultrasonic welding forming a weld joint between the overlapping edge portions of the thermoplastic sheet and the scuff panel along the length of the scuff panel.

In one embodiment, the thermoplastic sheet and the scuff panel are fabricated of fiberglass reinforced plastic such as polypropylene resin reinforced with glass fiber. Preferably, the glass reinforced thermoplastic scuff panel includes fibrous material on one side of the scuff panel, the scuff panel being positioned such that the fibrous material side of the panel faces the thermoplastic sheet during the ultrasonic welding. Suitable types of fibrous material include polyester fibers, fiberglass mat or spun fiberglass materials, nylon fibers, PVC, among others.

The present invention is also directed to a method of fabricating a thermoplastic composite liner comprising a fiber reinforced thermoplastic scuff panel affixed to a fiber reinforced thermoplastic sheet for use as an inner wall of a trailer and adapted to be affixed to supports of the trailer. The steps of the method include: a) positioning the scuff panel on a first table such that an edge portion of the scuff panel overlies an anvil; b) positioning a thermoplastic sheet on a second table such that an edge portion of the thermoplastic sheet overlies and overlaps the edge portion of the scuff panel overlying the anvil, a region of overlap being centered on the anvil; c) positioning an ultrasonic welder such that a horn of the welder contacts the region of overlap and is aligned with the anvil; d) energizing the welder to generate a weld section that affixes the thermoplastic sheet and scuff panel together; e) deenergizing and moving the ultrasonic welder along the anvil to a position adjacent the weld section; and f) repeating steps c-e such that the horn repeatedly generates adjacent weld sections along the region of overlap to form a linear weld extending a length of the scuff panel.

Preferably, the glass reinforced thermoplastic scuff panel includes fibrous material on one side of the scuff panel, the scuff panel being positioned such that the fibrous material side of the panel faces the thermoplastic sheet during the ultrasonic welding.

These and other objects, advantages, and features of the exemplary embodiment of the invention are described in detail in conjunction with the accompanying drawings.

BRIEF DESCRIPTION OF THE DRAWINGS

FIG. 4 is a perspective view of an anvil of the welding apparatus of FIG. 3;

FIG. 5 is a top plan view of the anvil of FIG. 4;

FIG. 6 is a front elevation view of the anvil of FIG. 4;

FIG. 7 is a side elevation view of the anvil of FIG. 4;

FIG. 8 is a side elevation view of the welding apparatus of FIG. 3;

FIG. 13 is a perspective view of a sound box of the welding apparatus of FIG. 3;

FIG. 14 is a front elevation view of the sound box of FIG. 13;

FIG. 15 is a sectional view of the sound box of FIG. 13 as seen from a plane indicated the line 15-15 in FIG. 14;

FIG. 16 is a top plan view of the sound box of FIG. 13;

FIG. 17 is a perspective view of the gantry of the welding apparatus of FIG. 3;

FIG. 18 is a front elevation view of the gantry of FIG. 17; and

FIG. 19 is a top plan view of the gantry of FIG. 18.

DETAILED DESCRIPTION

Figure 1:
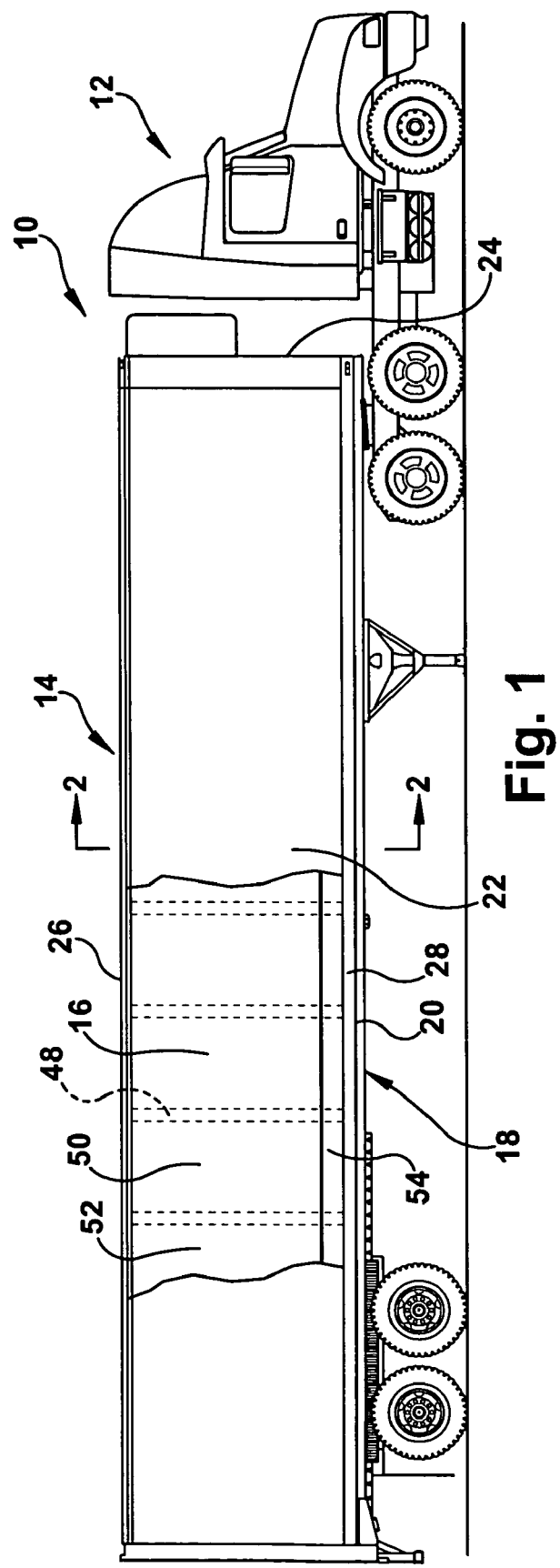
FIG. 1 is a side elevation view of a refrigerated trailer including a thermoplastic composite liner of the present invention.

Referring to the drawings, FIG. 1 shows an over-the-road tractor trailer at 10. A tractor 12 is hitched to and pulls a refrigerated trailer 14. The trailer 14 defines an interior cargo carrying area 16 and comprises an undercarriage assembly 18 that supports a bed 20 of the trailer, side walls 22, a front wall 24, a rear door (not shown) and a roof or top panel 26. The bed 20 of the trailer includes a beam 28 that supports a layer of insulation 30 and an aluminum floor 32. The side walls 22 comprise a core 34 sandwiched between outer and inner side walls or skins 38, 40. As can best be seen in FIG. 2, the core 34 is supported between a bottom rail 42, a top rail 44 and a right angled channel 46.

Depending on the trailer manufacturer, the core 34 of the refrigerated trailer 14 may include a plurality of upright posts or supports 48, typically z-shaped in cross section and fabricated of aluminum or a non-thermally conductive material such as a fiberglass or polyester pultrusion to minimize heat transfer. An insulation foam 49, such as a thermoset plastic foam, preferably urethane foam, is foamed in between the outer and inner side wall skins 38, 40 and the supports 48. Typically, the inner and outer walls 40, 38 and the supports 48 are positioned in a fixture and the foam 49 is then foamed in to complete the side wall core 34. Some trailer manufacturers do not use supports 48 in the core 34, relying instead only on the foam 49 for structural rigidity.

The outer side wall 38 is preferably fiberglass or steel, while at least a portion of the inner side wall 40 is fabricated of a thermoplastic composite liner 50, as described below. Depending on the requirements of the trailer manufacturer, the thermoplastic liner 50 may extend the entire interior length and height of the inner side wall 40 or a somewhat smaller area to account, for example, for portions of the side wall taken up by a front wall frame area at the front of the trailer 14 and rear frame area adjacent the rear of the trailer 14 that are not overlaid by the liner 50. The liner 50 is affixed to core 34 by the adhesion between the urethane foam 49 and the liner 50. More specifically, the foam 49 adheres to an inner side 51 of the liner 50 comprising a roughened outer surface with fibrous material embedded therein. This roughened surface is typically referred to an "scrim" or "scrim side". The fibrous material may include polyester fibers, fiberglass mat or spun fiberglass materials, nylon fibers, PVC, among others. For additional attachment strength, mastics, adhesives or PVC fasteners may be used around the edges of the liner 50.

In trailers, such as dry freight trailers, where no insulation foam is present, the side walls 22 comprise a plurality of supports 48 extending between the bottom and top rails 42, 44. In such a construction, the liner 50 is affixed to the supports 48 by mastics, adhesives, or mechanical fasteners such metal or PVC rivets. Metal rivets and other metal fasteners may be used where heat transfer is not an issue and the nature of the cargo does not require a smooth inner wall surface. It should be recognized that the liner 50 of the present invention is equally applicable to many types of cargo carrying vehicles such as trailers, vans, delivery vehicles, rail cars, etc., and it is the intent of the inventors to use the word trailer to include all such cargo carrying vehicles.

Composition of Composite Thermoplastic Liner 50

The composite thermoplastic liner 50 comprises a rectangular thermoplastic composite sheet 52 and an integral thermoplastic composite scuff liner 54. The thermoplastic sheet 52 and scuff panel are preferably comprised of fiber-reinforced polymer (FRP) such as a polypropylene resin reinforced with glass fiber. Alternately, other types of FRP may be utilized including the following resins reinforced with glass fibers: acrylonitrile butadiene styrene (ABS), polyetherketoneketones (PEEK), polyetherketoneketones (PEKK), polyaryletherketones (PAEK or PEK), polyethylene terephthalate (PET), high density polyethylene (HDPE), polypropylene (PP), polybutylene terephthalate (PBT), and nylon resin reinforced with glass fiber. The thermoplastic sheet 52 is permanently bonded to the scuff panel 54 by ultrasonic welding. The ultrasonic welding, described below, resulting in a linear weld joint 56 that extends a length l of the scuff panel 54. The weld joint 54 provides a positive watertight and airtight seal between the two pieces 52, 54.

The scuff panel 54 is typically much thicker and narrower than the thermoplastic sheet 52. The thermoplastic sheet 52 and the scuff panel 54 both function to protect the core 34 from damage from impact by the cargo, pallets, the forks of lift trucks, etc., while cargo is being moved into and out of the trailer 14. The narrower scuff panel 54 will typically be positioned adjacent the trailer floor 32 where greater damage from lift truck forks and pallet edges would be expected. In addition to protecting the core 34, the liner 50 functions as an additional layer of insulation in the refrigerated trailer 14. The thickness and width of the thermoplastic sheet 52 and the scuff panel 54 would depend on the specific application, size of the trailer 12, type of trailer, etc. A typical thickness for the thermoplastic sheet 52 would be in a range of about 0.020-0.090 inch with a width of about 80-100 inches, while a typical thickness for the scuff panel 54 would be in a range of about 0.100-0.250 inches with a width of 12-48 inches.

Suitable thermoplastic sheets 52 and thermoplastic scuff panels 54 are sold under the trade name BULITEX® wall and scuff panels by U.S. Liner Company of Cranberry Township, Pa. 16066 (www.bulitex.com). The BULITEX raw material panels are normally sold in 600-1200 foot coils of varying widths and varying thicknesses. Other suppliers of suitable composite thermoplastic sheets include Crane Composites, Channahon, Ill. 60410 (www.cranecomposites.com) which sells a thermocomposite product under the trade name ZENICON®; Adzel, Inc. of Southfield, Mich. 48076 (www.azdel.com); and Polystrand, Inc. of Montrose, Colo. 81401 (www.polystrand.com). ZENICON® is a continuous fiber reinforced thermoplastic that can be fabricated from a variety of resins including polypropylene, polyethylene, PET, and nylon and a variety of reinforcement materials including fiberglass, aramid fiber and carbon fiber.

A desired length of the thermoplastic sheet 52 is cut from a roll and a desired length of the scuff panel 54 is cut off from another roll. One side or face 52a of the plastic sheet 52 is smooth and the other side 52b has a rougher, fibrous finish. The fibrous surface side 52b, as noted above, is typically referred to as scrim. The scrim surface 52b is provided by the manufacturer of the thermoplastic sheet to facilitate the urethane insulation foam 49 bonding to the thermoplastic sheet 52, as mentioned above. The same is true with regard to the thermoplastic scuff panel 54, one side 54a is smooth, while the opposite side 54b has a fibrous polyester finish. When the liner 50 is installed, the scrim sides 52b, 54b of the thermoplastic sheet 52 and the scuff panel 54 face the core 34 to facilitate bonding with the foam 49, while the smooth sides 52a, 54a face the cargo area 16 to provide a smooth, low friction finish.

While it is preferred that the thermoplastic sheet 52 and the scuff panel 54 be fabricated of thermoplastic FRP material, it should be understood that the liner 50 of the present invention may fabricated of any plastic sheets that may be successfully ultrasonically welded.

Ultrasonic Welding Apparatus

The present invention includes an ultrasonic welding apparatus 100, shown in FIGS. 3-19, utilized to ultrasonically weld the thermoplastic sheet 52 and the scuff panel 54 to form the integral composite liner 50. The welding apparatus 100 includes an ultrasonic welder assembly 102 mounted on a robotic gantry 104. The apparatus 100 provides for both horizontal and vertical movement of the welder assembly 102 with respect to a stationary anvil 106.

Figure 2:
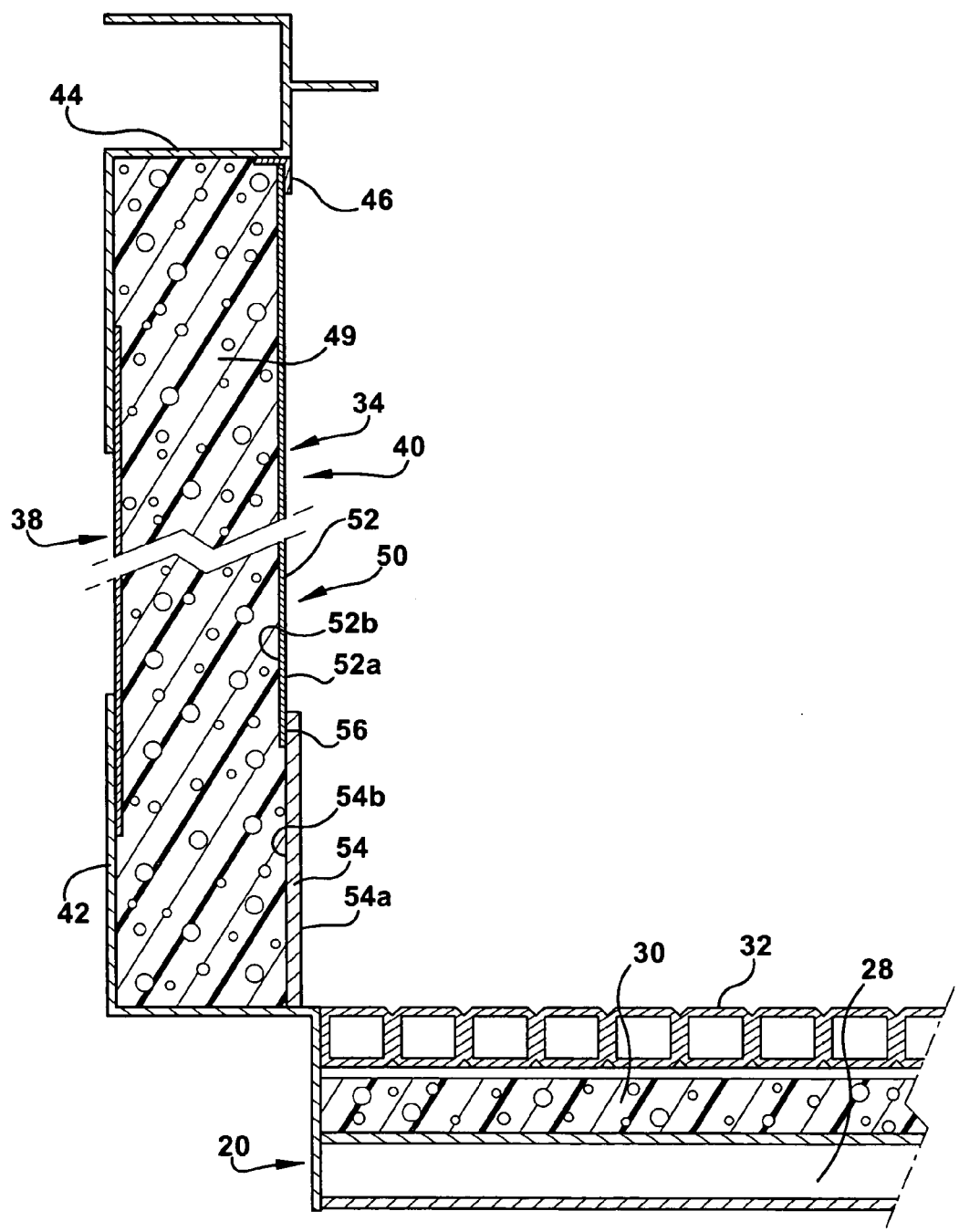
FIG. 2 is a sectional view of a portion of the trailer of FIG. 1 as seen from a plane indicated by the line 2-2 in FIG. 1 showing the thermoplastic composite liner of the present invention.
Figure 3:
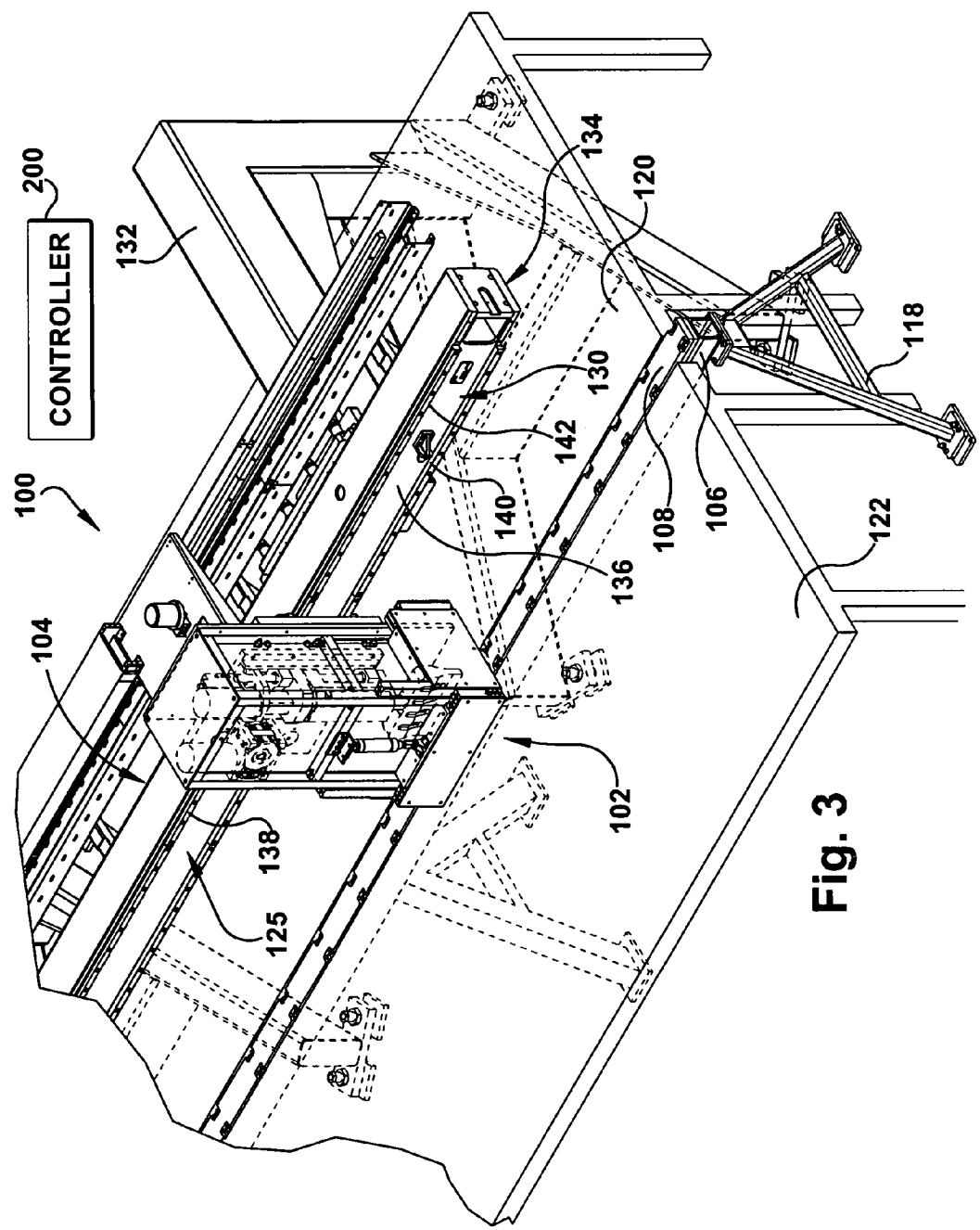
FIG. 3 is a schematic perspective view of a portion of the welding apparatus of the present invention.
Figure 3A:
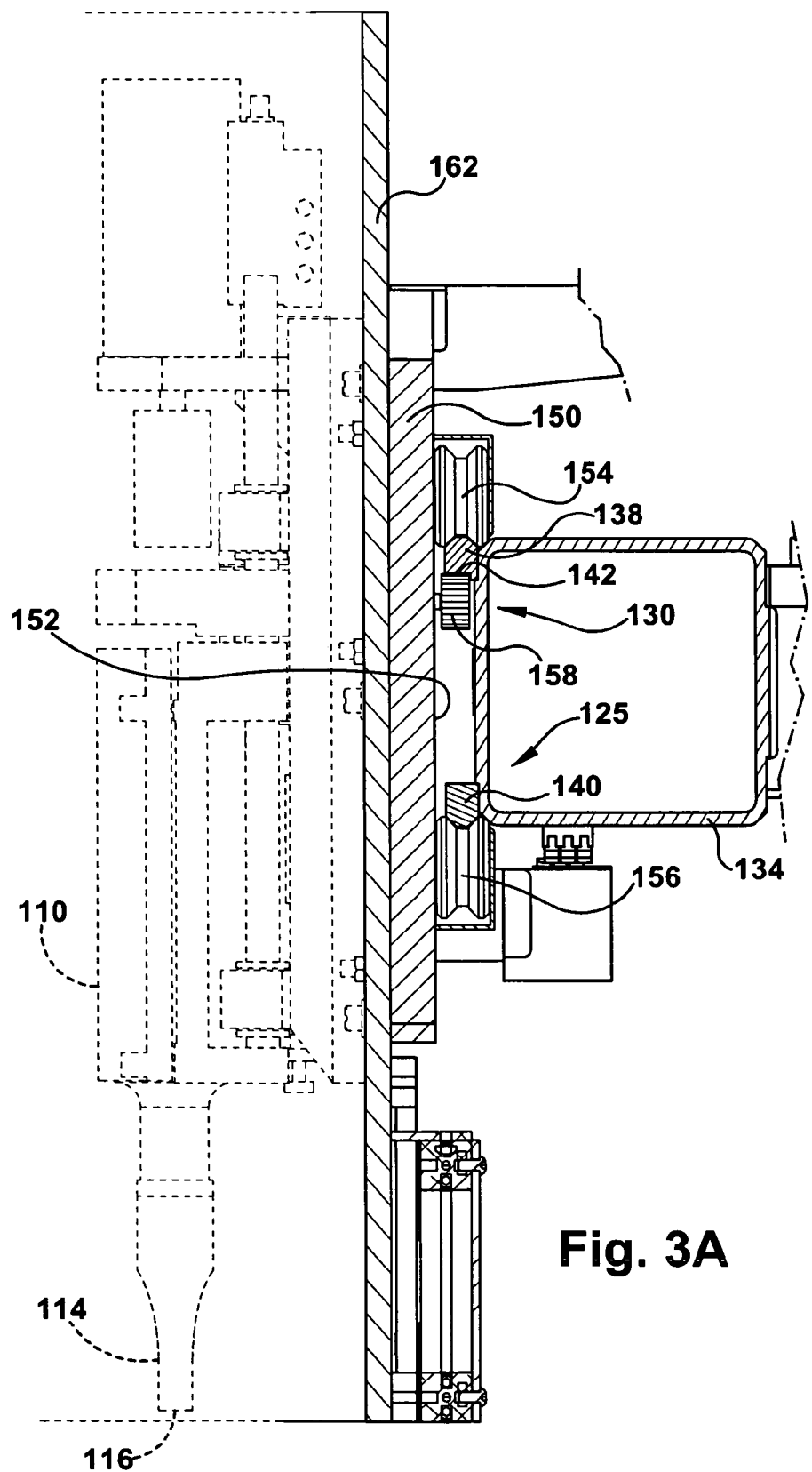
FIG. 3A is an enlarged sectional view of a portion of the welding apparatus of FIG. 3.
Figure 9:
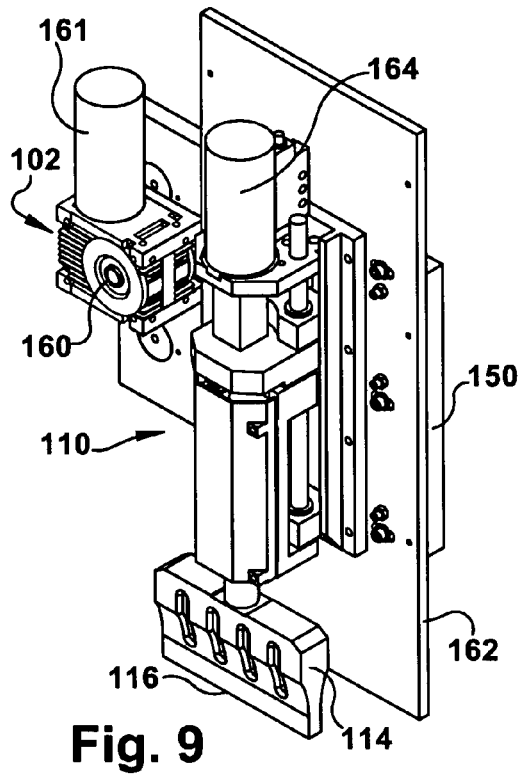
FIG. 9 is a perspective view of a welding assembly of the welding apparatus of FIG. 3.
Figure 12:
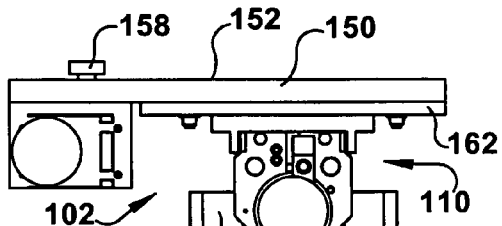
FIG. 12 is a top plan view of the welding assembly of FIG. 9.
Figure 10:
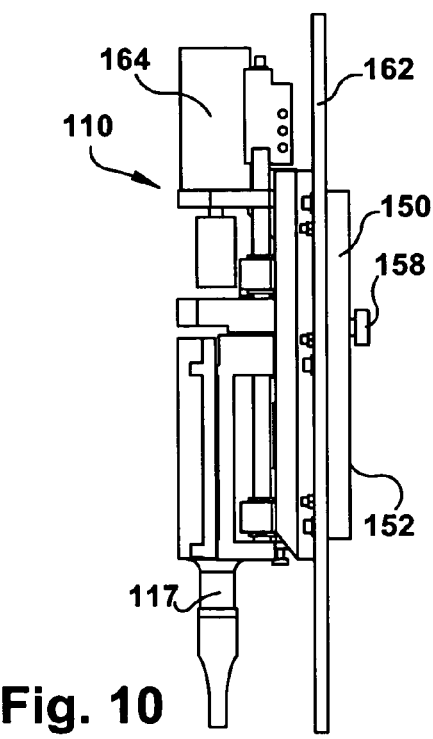
FIG. 10 is a side elevation view of the welding assembly of FIG. 9.
Figure 11:
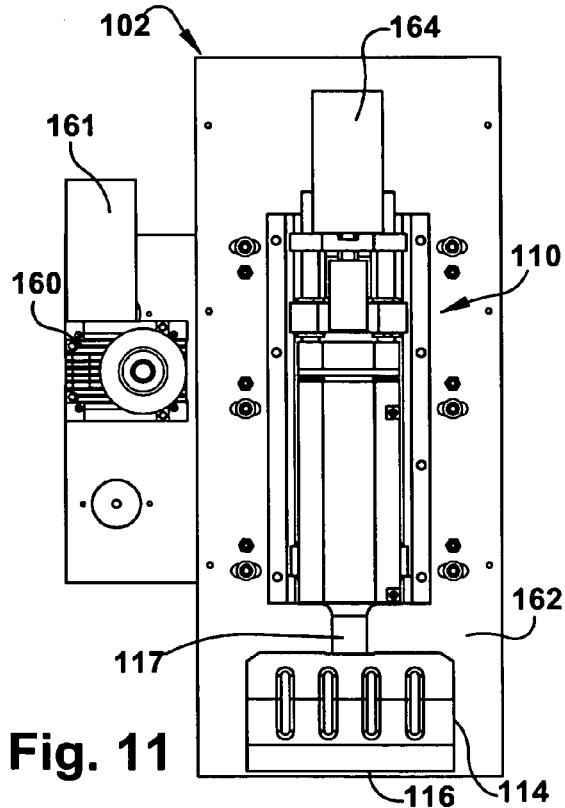
FIG. 11 is a front elevation view of the welding assembly of FIG. 9.

The ultrasonic welder assembly 102 includes a 15 KHz ultrasonic welder 110 (best shown in FIGS. 9-12) and a sound box 112 (best shown in FIG. 13-16) surrounding the welder 110. One suitable welder is the Model 1596 utrasonic welder manufactured by Sonics & Materials, Inc., Newtown, Conn. 06470 (www.sonics.biz). The welder 110 includes a welding horn 114 which transmits ultrasonic vibrations through a welding face 116 of the horn 114 to an overlapping region of the thermoplastic sheet 52 and the scuff panel 54 to form the ultrasonic weld joint 56. The overlapping region of the thermoplastic sheet 52 and scuff panel 54 is referred to as the lap joint. As can be seen in FIG. 2, regions of the thermoplastic sheet 52 and the scuff panel 54 other than the overlapping edge portions are not in contact. The horn 114 is attached to a welding head 117 which moves vertically to cause the horn welding face 115 contact and clamp against the lap joint with a pressure of 200-500 lbs of force. The horn welding face 115, in one embodiment, is 12 inches in length and one inch wide, thereby creating a 12 inch by 1 inch wide weld section with each actuation, and is fabricated of non-marring titanium. Alternately, the horn welding face 115 may be fabricated from chromed aluminum.

The sound box 112 surrounds the welder 110 and moves vertically with the welder to shield persons in the vicinity from the noise generated during the welding process and also to preclamp the thermoplastic sheet 52 and the scuff panel 54 prior to the welding head 118 moving the horn 114 downwardly to contact and weld the lap joint.

As can best be seen in FIGS. 3 and 4-7, the welding apparatus 100 further includes the steel anvil 106 which extends horizontally 60 feet in length and has an upper surface 108 which is approximately four inches wide and provides a static backing or support surface against which the horn 114 compresses the overlapping regions of the thermoplastic sheet 52 and the scuff panel 54 during the welding process. The anvil 106 is comprised of a set of cold rolled machined bars. The upper surface 108 of the anvil 106 is leveled with respect to the horn welding face 116 with an accuracy of less than 0.015 inch to insure uniformity in the welding joint across the horn face 116. The anvil 106 is supported by a series of A-shaped support frames 118 which are spaced apart in 10 foot intervals. On opposite sides the anvil 106 are support tables 120, 122 which have upper surfaces adjacent to and even with the upper surface of the anvil 102. The inner support table 120 (that is, the one closest to the welding gantry 104) supports the scuff panel 54 while the outer support table 122 supports the plastic sheet 52.

The gantry 104 (best seen in FIGS. 3, 3A, and 17-19) supports the welding assembly 102 for accurate horizontal movement parallel to the anvil 106 via a linear rail system 125 and a rack and pinion drive system 130. The gantry 104 comprises a series of C-shaped support frames 132. The C-shaped frames 132 support a square tube 134 which extends parallel to but vertically above the anvil 106. Disposed on an inwardly facing vertical side 136 (that is, facing toward the anvil 106) of the tube 134 are a set of horizontal bearing support guiderails 138, 140 of the linear rail system 125. The upper guiderail 138 also supports a rack 142 of the rack and pinion drive system 130.

The welding assembly 102, including the welder 110 and the sound box 112 are supported by a vertical carriage plate 150. Mounted to the back side 152 of the carriage plate 150 are a spaced apart pair of upper roller bearings 154 that roll along the upper guiderail 138 and a spaced apart pair of lower roller bearings 156 that roll along the lower guiderail 140. Extending through the carriage plate 150 is a shaft supporting a pinion gear 158 which engages the teeth of the rack 142. The pinion gear 158 is driven by a servo motor gearbox 160 coupled to a servo motor 161 (FIG. 4), acting under the control of control electronics 200 of welding apparatus 100 to precisely move the welder 110. The welder 110 is mounted to a welder mounting plate 162 which, in turn, is affixed to the carriage plate 150.

The welder assembly 102 includes a pneumatic piston 164 that, operating under the control of the control electronics, which vertically raises and lowers the welding head 117 to cause the horn 114 to contact and weld the lap joint. The sound box 112 is also moved vertically by a pneumatic piston 166 operating under the control of control electronics, including a controller.

Advantageously, the welding apparatus 100 of the present invention has the capability of ultrasonically welding thermoplastic sheets and scuff panels of different lengths, widths and thicknesses and can weld the scuff panel 54 at any desired position on the thermoplastic sheet 52.

Fabrication of the Thermoplastic Composite Liner 50

Operating under the control of the welding apparatus control electronics 200, the weld joint 56 is created by the welding 102 by repetitively generating a series of 12 inch weld joint sections on the thermoplastic sheet 52 and the scuff panel 54 over the length l of the scuff panel. After a weld joint section is completed, the servomotor 161 is actuated to move the carriage plate 150 (and thereby the welding assembly 102) 12 inches down the gantry 104 and the process is repeated until the entire length of the scuff panel 54 has been welded to the thermoplastic sheet 52. The 12 inch weld section results from the 12 inch length of the welder horn face 116. It should be recognized, of course, that the width of the weld joint 56 may be easily changed by changing to a different with horn 114.

To start the process of fabricating the thermoplastic composite liner 50, an appropriate length piece of the scuff panel 54 is placed on the scuff panel table 120 with the scrim side 54b upward. An appropriate length piece of the thermoplastic sheet 52 is then placed on the support table 122 with the scrim side 52b upward toward the welding horn 114. Placing the scrim sides 52b, 54b upward is important to eliminate any surface marring that the horn face 116 may cause during the welding process would not be on the cargo facing side of the completed liner 50. Further, the scrim of the scuff panel scrim side 54b aids the welding process by providing for proper melted resin wet-out.

The control electronics controller 200 cycles the welder 110 and the sound box 112. Specifically, the sound box piston 166 is actuated to move the sound box 112 downwardly against the anvil 106 to preclamp the thermoplastic piece 52 and the scuff panel 54 in place. Then, the welder piston 164 is actuated to move weld head 117 and horn 114 such that the horn welding face 166 contacts and applies 200-500 lbs of pressure against the thermoplastic piece 52 and the scuff panel 54. The welder 110 is actuated thereby creating a 12 long ultrasonic weld joint section between the thermoplastic piece 52 and scuff panel 54. When the weld joint section is complete (usually less than 10 seconds), the respective pistons 164, 166 are actuated to retract first the weld head 117 and the sound box 112. The servomotor 161 is actuated to move the welding assembly 102 in the x direction (horizontal) downstream 12 inches and the welding cycle is repeated.

The welder assembly 102 is moved in the x-direction based on controls from the servo motor drive and the control electronics controller 200. The controller 200 is programmed to make a desired number of welds in so much distance in so much time. The welder assembly 102 moved down the gantry 104 by the mechanical rack and pinion drive 130 and the linear rail system 125. This provides a smooth, accurate, and rugged motion that has positional repeatability to less than 0.005 inch. Once the welder assembly 102 has reached a desired x-position, the weld head 117 clamps the horn 114 down in the y-direction and creates the weld section. Once the weld section is completed the process is repeated until the weld joint 56 is complete. After the weld joint 56 is complete, the welder assembly 102 returns to a home position on the gantry 104 waiting for new inputs for the next liner. The resulting liner 50 has a continuous, smooth surface facing the cargo area 16 and since the weld joint 56 extends along the entire length l of the scuff panel 54, the seal is complete and moistureproof.

The ultrasonic welding process of the welder 110 uses an electronic signal that excites piezo crystals in a converter. The converter produces the mechanical vibration at ultrasonic frequencies 5-40 KHz. Those vibrations are multiplied by a booster that changes the amplitude of the vibration. The design of the horn 114 also contributes to amplitude modification. Both of these amplitude adjustments are referred to as "gain in the system." The gain of a system is designed into the welder 110 to produce the necessary energy transfer into the lap joint need to heat the overlapping materials of the thermoplastic sheet 52 and the thermoplastic scuff panel 54. Once the welder is cycled, the horn 114 clamps down onto the lap joint with 200 lbs-500 lbs force.

After clamping, the ultrasonic vibration begins and vibrates the substrates of the overlapping regions of the thermoplastic sheet 52 and the scuff panel 54 under the horn welding face 116 relative to each other. This micro vibration excites the materials and raises their temperatures above the transition temp for the thermoplastic. The amount of energy that is conveyed to the weld joint may be controlled by setting the "watt-seconds" for the weld cycle. This allows for a more consistent weld and better quality. Additionally, the amount of energy input into the weld joint can be closely controlled. Once the vibrations stop and the weld joint section is complete, the horn 114 remains on the material in a clamped state to allow the horn to conduct excess heat from the joint and allow the substrates to fall below the transition temperature, that is, to solidify. Additionally, cooling air is ducted to and blown on the weld section to aid in consolidation of the joint.

During the welding process, the thermoplastic resin melts but the glass and fibrous material do not. This allows the resin to flow around the glass and fibrous material which promotes bond strength and cause the weld joint 56 to be in a more homogeneous state. Advantageously, it should be noted that the weld joint 56 is constructed of the two raw materials, i.e., the thermoplastic sheet 52 and the scuff panel 54 only. No other materials are required to complete the welding process. The fibrous scrim of the scuff panel 54 facing the sheet 52 helps create proper wet-out of the liquid thermoplastic for a better weld joint during the welding process.

It should be recognized that while a simple overlapping lap joint is shown in the drawings, various other joints could be used and are contemplated by the present invention, including, without limitation, overlap, offset lap, ship lap and tongue and groove lap.

While the present invention has been described with a degree of particularity, it is the intent that the invention includes all modifications and alterations from the disclosed design falling with the spirit or scope of the appended claims.

We claim:

1. A thermoplastic composite liner for use as an inner wall of a trailer, the thermoplastic composite liner comprising:
    a) a glass reinforced thermoplastic sheet permanently affixed by a lap seam ultrasonic weld joint to a glass reinforced thermoplastic scuff panel along a length of the scuff panel by ultrasonic welding;
    b) the scuff panel being positioned relative to the thermoplastic sheet such that an edge portion of a first side of the thermoplastic sheet overlaps and is welded to an edge portion of a first side of the scuff panel along the length of the scuff panel; and
    c) the ultrasonic welding forming the lap seam weld joint between the overlapping edge portions of the thermoplastic sheet and the scuff panel along the length of the scuff panel, wherein regions of the first side of the scuff panel and the first side of the thermoplastic sheet other than the overlapping edge portions of the first sides of the scuff panel and the thermoplastic liner not being in contact.

2. The composite liner of claim 1 wherein the thermoplastic sheet and the scuff panel are fabricated of fiber-reinforced polymer.

3. The composite liner of claim 2 wherein the fiber-reinforced polymer comprises polypropylene resin reinforced with glass fiber.

4. The composite liner of claim 1 wherein the glass reinforced thermoplastic scuff panel includes fibrous material on the first side of the scuff panel, the scuff panel being positioned such that the fibrous material in a region of the overlapping edge of the first side of the panel contacts and is welded to the thermoplastic sheet during the ultrasonic welding.

5. The composite liner of claim 4 wherein the fibrous material is polyester.

* * * * *